G. A. KINKEL.
COMBINATION KETTLE.
APPLICATION FILED NOV. 20, 1914.
1,238,688.
Patented Aug. 28, 1917.
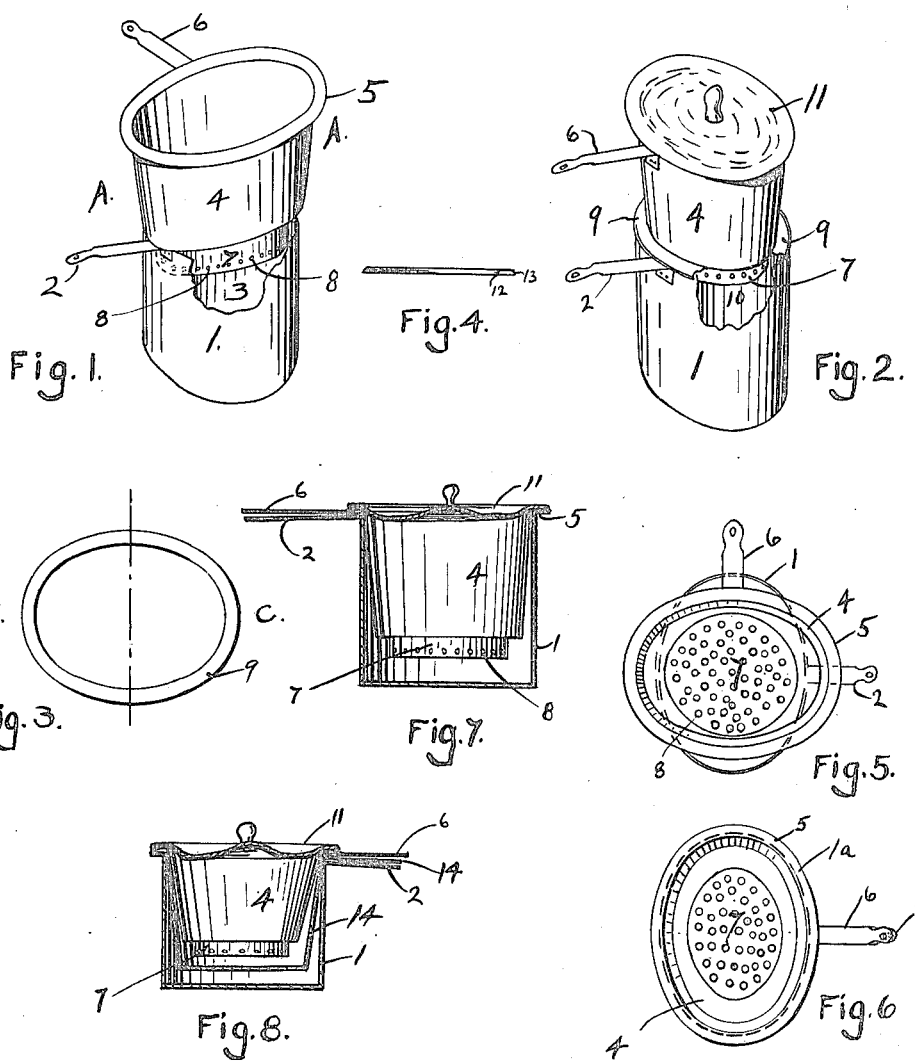
WITNESSES:
N. L. Cook
M. M. Rothfus
INVENTOR
Gustavus A. Kinkel,
by his attorney
J. Edward Thebaud.

UNITED STATES PATENT OFFICE.

GUSTAVUS A. KINKEL, OF BUFFALO, NEW YORK.

COMBINATION-KETTLE.

1,238,688.  Specification of Letters Patent.  Patented Aug. 28, 1917.

Application filed November 20, 1914. Serial No. 873,184.

*To all whom it may concern:*

Be it known that I, GUSTAVUS A. KINKEL, a citizen of the United States, residing at Buffalo, in the county of Erie and State of New York, have invented certain new and useful Improvements in Combination-Kettles, of which the following is a specification, reference being had to the accompanying drawings, and to figures of reference marked thereon, which form part of this specification.

Like figures of reference refer to like parts.

This invention relates to combination kettles, particularly to that kind which has a porous bottom on the inner kettle for supporting food to be boiled or steamed.

One of the objects of this invention is to provide a combination kettle, that will permit of supporting one part upon the other, while draining off the water from the food stuff into the outer kettle.

Another object is to provide a combination kettle that has its parts adapted to rest one upon the other for draining purposes, without the use of lugs or extra supports and thus produce an article of cheap manufacture, that is serviceable. Other uses of this invention are mentioned below.

To fulfil these objects, I provide co-fitting kettles which have elongated sections, and have a reduced extended porous bottom on the inner kettle. This bottom extension has no axial diameter greater than the minor axial diameter of the rim of the outer kettle.

The details of construction of one form of my invention are illustrated in the accompanying drawings. The function of the parts is hereinafter explained and what I claim is set forth, In the drawings, Figure 1 is a perspective view of two co-fitting kettles embodying my invention, having one resting upon the rim of the other for draining purposes, having the edges of the bottom of the inner kettle, on its major diameter, over-lapping the rim of the outer kettle on its minor diameter.

Fig. 2 shows the inner kettle supported on a ring on the outer kettle, having the major diameters in about the same vertical plane.

Fig. 3 is a plan of the ring referred to in Fig. 2.

Fig. 4 is a section of the said ring taken on the line X—X of Fig. 3.

Fig. 5 is a plan of the co-fitting kettles, when positioned as shown in Fig. 1.

Fig. 6 is a plan of the combination kettle when the parts are fitted together having the outer kettle enveloping the inner kettle.

Fig. 7 is a vertical section of the combination kettles, when they are positioned for boiling the food, while being immersed.

Fig. 8 is a vertical section of said combination kettle, having an extra kettle nested between the inner and the outer kettles.

Referring to Fig. 1, the outer kettle 1 is provided with a handle 2 and is broken away at 3 to show the bottom construction of the inner kettle 4. 5 is the flanged rim of the inner kettle 4, and 6 is a handle. The reduced bottom extension 7 of the inner kettle 4 is shown to be perforated at 8, 8. The flat bottom of the said extension 7 is also perforated, but not shown. The inner kettle 4 is shown to be elongated in the direction A. A., while the outer kettle 1 is reduced in the same direction as positioned in this figure.

In Fig. 2, the kettles rest together with the elongated diameter in the same direction. The ring 9, resting on the rim of the outer kettle 1, supports the inner kettle 4, so that the perforated bottom of the inner kettle 4 is sealed within the upper part of outer kettle 1, which is shown at 10, where the outer kettle 1 is broken away. The cover 11 completes the outfit for steaming purposes.

In Fig. 3 the ring 9 is shown to have an elongated diameter between B and C.

In Fig. 4, the inner and outer edges, respectively marked 12 and 13 are shown to be turned down.

In Fig. 5 the porous bottom extension 7 is shown to be within the rim of the outer kettle 1, while the overlapping of the edges on the major diameter of the inner kettle 4, on the minor diameter of the rim of the outer kettle, is clearly shown.

In Fig. 6 the broken line 1ª represents the rim of the outer kettle beneath the flange 5 of the inner kettle 4 showing how the kettles co-fit together.

In Fig. 7 the inner kettle 4 is shown suspended within the outer kettle 1 having its flanged rim 5 resting upon the rim of the said outer kettle 1.

In Fig. 8 an intermediate kettle 14 is shown nested between the inner kettle 4 and the outer kettle 1. This intermediate kettle 14 is provided with and co-fits with the inner kettle 4 and outer kettle 1, for purposes of convenience, whereby in use, the inner kettle 4 can be laid aside and the intermediate kettle 14, which is not porous, can be used in place thereof in cooking where it is desired to keep the water in the outer kettle 1 from the food contained in the kettle 14. If it is desired to keep some food stuff warm while using the kettles 14 and 1 together, the ring 9 may be used as shown in Fig. 2 to support the kettle 4 above the kettle 14 and this combination of the three kettles can thus serve joint purposes.

Of course, any other than elliptical kettles may be used to accomplish the purpose of this invention, as long as the kettles co-fit and have one elongated diameter, whether the section be square, rectangular or otherwise, adapting one kettle to be rested over the other, having the longer diameters crossed, with the rim of the lower kettle enveloping a reduced bottom extension of the upper kettle.

Having described my invention, I claim:

A combination kettle, comprising two oblong-shaped co-fitting receptacles, one closely fitting and extending down into the other, the inner of said receptacles having a perforated bottom extension of less diameter than that of the lower portion of said inner kettle, from which it extends, whereby a shoulder is formed at said lower portion, said extension having a major diameter less than the minor diameter of the rim of the outer receptacle and said shoulder having a major diameter larger than the minor diameter of the rim of said outer receptacle, whereby the inner kettle may be placed having said shoulder resting upon the rim of the outer kettle, having the major axis of the inner kettle across the major axis of the outer kettle, and having said extension suspended within said outer kettle, below the rim thereof.

GUSTAVUS A. KINKEL.

Witnesses:
 D. H. HARPER,
 N. L. COOK.